(12) United States Patent
Aher et al.

(10) Patent No.: US 11,410,656 B2
(45) Date of Patent: Aug. 9, 2022

(54) SYSTEMS AND METHODS FOR MANAGING VOICE QUERIES USING PRONUNCIATION INFORMATION

(71) Applicant: Rovi Guides, Inc., San Jose, CA (US)

(72) Inventors: Ankur Aher, Kalyan (IN); Indranil Coomar Doss, Bengaluru (IN); Aashish Goyal, Bengaluru (IN); Aman Puniyani, Rohtak (IN); Kandala Reddy, Bangalore (IN); Mithun Umesh, Bangalore (IN)

(73) Assignee: ROVI GUIDES, INC., San Jose, CA (US)

( * ) Notice: Subject to any disclaimer, the term of this patent is extended or adjusted under 35 U.S.C. 154(b) by 0 days.

(21) Appl. No.: 16/528,550

(22) Filed: Jul. 31, 2019

(65) Prior Publication Data

US 2021/0035587 A1 Feb. 4, 2021

(51) Int. Cl.
*G10L 15/26* (2006.01)
*G10L 15/22* (2006.01)
*G10L 15/187* (2013.01)
*G10L 13/02* (2013.01)

(52) U.S. Cl.
CPC .............. *G10L 15/26* (2013.01); *G10L 13/02* (2013.01); *G10L 15/187* (2013.01); *G10L 15/22* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 5,737,485 A * | 4/1998 | Flanagan | ................ | G10L 15/16 704/232 |
| 7,181,395 B1 | 2/2007 | Deligne et al. | | |
| 8,239,944 B1 | 8/2012 | Nachenberg et al. | | |
| 8,423,565 B2 * | 4/2013 | Redlich | ................. | G06F 16/951 707/777 |
| 9,043,199 B1 | 5/2015 | Hayes | | |
| 9,098,551 B1 | 8/2015 | Fryz et al. | | |
| 9,812,120 B2 * | 11/2017 | Takatsuka | ............. | G10L 13/027 |

(Continued)

FOREIGN PATENT DOCUMENTS

WO   2016167992 A1   10/2016

OTHER PUBLICATIONS

U.S. Appl. No. 16/528,539, filed Jul. 31, 2019, Ankur Aher.

(Continued)

*Primary Examiner* — Neeraj Sharma
(74) *Attorney, Agent, or Firm* — Haley Guiliano LLP

(57) ABSTRACT

The system identifies one or more entities or content items among a plurality of stored information. The system generates an audio file based on a first text string that represents the entity or content item. Based on the first text string and at least one speech criterion, the system generating, using a speech-to-text module a second text string based on the audio file. The system then compares the text strings and stores the second text string if it is not identical to the first text string. The system generates metadata that includes results from text-speech-text conversions to forecast possible misidentifications when responding to voice queries during search operations. The metadata includes alternative representations of the entity.

18 Claims, 9 Drawing Sheets

(56) References Cited

U.S. PATENT DOCUMENTS

| | | |
|---|---|---|
| 11,157,696 B1 | 10/2021 | Ramos et al. |
| 2011/0167053 A1 | 7/2011 | Lawler et al. |
| 2014/0359523 A1 | 12/2014 | Jang |
| 2015/0142812 A1* | 5/2015 | Ma .................. G06F 16/3334 707/739 |
| 2015/0371636 A1* | 12/2015 | Raedel ............... H04M 3/2281 704/235 |
| 2016/0098493 A1* | 4/2016 | Primke ................ H04L 65/403 707/754 |
| 2016/0180840 A1 | 6/2016 | Siddiq et al. |
| 2017/0068423 A1 | 3/2017 | Napolitano et al. |
| 2017/0147576 A1 | 5/2017 | Des Jardins |
| 2017/0264939 A1 | 9/2017 | Jang et al. |
| 2018/0024901 A1* | 1/2018 | Tankersley ......... G06F 16/2379 707/694 |
| 2018/0166073 A1* | 6/2018 | Gandiga ............. G10L 21/028 |
| 2019/0036856 A1 | 1/2019 | Bergenlid et al. |
| 2019/0037357 A1 | 1/2019 | Bijor et al. |
| 2019/0149987 A1* | 5/2019 | Moore ........... H04W 12/00503 726/9 |
| 2019/0333499 A1* | 10/2019 | Li ......................... G10L 15/07 |
| 2019/0384821 A1 | 12/2019 | Alders et al. |
| 2020/0042514 A1 | 2/2020 | Svonja |
| 2020/0175968 A1* | 6/2020 | Donati ................. G10L 15/187 |
| 2020/0184958 A1* | 6/2020 | Norouzi .................. G09B 5/04 |
| 2020/0193975 A1* | 6/2020 | Blau-McCandliss ... G10L 13/10 |
| 2020/0357390 A1* | 11/2020 | Bromand .............. G10L 15/22 |
| 2020/0365136 A1 | 11/2020 | Candelore et al. |
| 2021/0011934 A1* | 1/2021 | Boxwell ............. G06F 16/3329 |
| 2021/0026901 A1* | 1/2021 | Aher ................ G06F 16/90344 |
| 2021/0034662 A1 | 2/2021 | Aher et al. |
| 2021/0034663 A1 | 2/2021 | Aher et al. |
| 2021/0241754 A1* | 8/2021 | Hiroya ................... G10L 15/02 |

OTHER PUBLICATIONS

U.S. Appl. No. 16/528,541, filed Jul. 31, 2019, Ankur Aher.
PCT International Search Report for International Application No. PCT/US2020/043131, dated Oct. 21, 2020 (14 pages).

* cited by examiner

SYSTEMS AND METHODS FOR MANAGING VOICE QUERIES USING PRONUNCIATION INFORMATION

BACKGROUND

The present disclosure relates to systems for managing voice queries, and, more particularly, systems for managing voice queries based on pronunciation information.

SUMMARY

In a conversation system, when a user fires a voice query to the system, the speech is converted to text using an Automatic Speech Recognition (ASR) module. This text then forms the input to a conversation system, which determines a response to the text. For example, when a user says "show me Tom Cruise movies" then the ASR module converts users voice to text and fires it to the conversation system. The conversation system only acts on the text it receives on from the ASR module. Sometimes in this process the conversation system loses the pronunciation details of words or sounds included in the user's query. The pronunciation details may provide information that can help with the search, especially when the same word has more than one pronunciation, and the pronunciations correspond to different meanings.

The present disclosure describes systems and methods that perform a search based on multiple contextual inputs to predict a user's intended search query as the user speaks the query words. The search may be based on multiple contextual inputs that include, for example, user search history, user likes and dislikes, general trends, pronunciation details of the query words, and any other suitable information. The application receives a voice query and generates a text query that is representative of the voice query. The application uses pronunciation information, which may be included in the text query, included in metadata associated with the text query, or included in metadata of entities in a database to more accurately retrieve search results. In some embodiments, the application generates metadata based on text-to-speech and speech-to-text conversions to improve reachability of entities from search queries.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
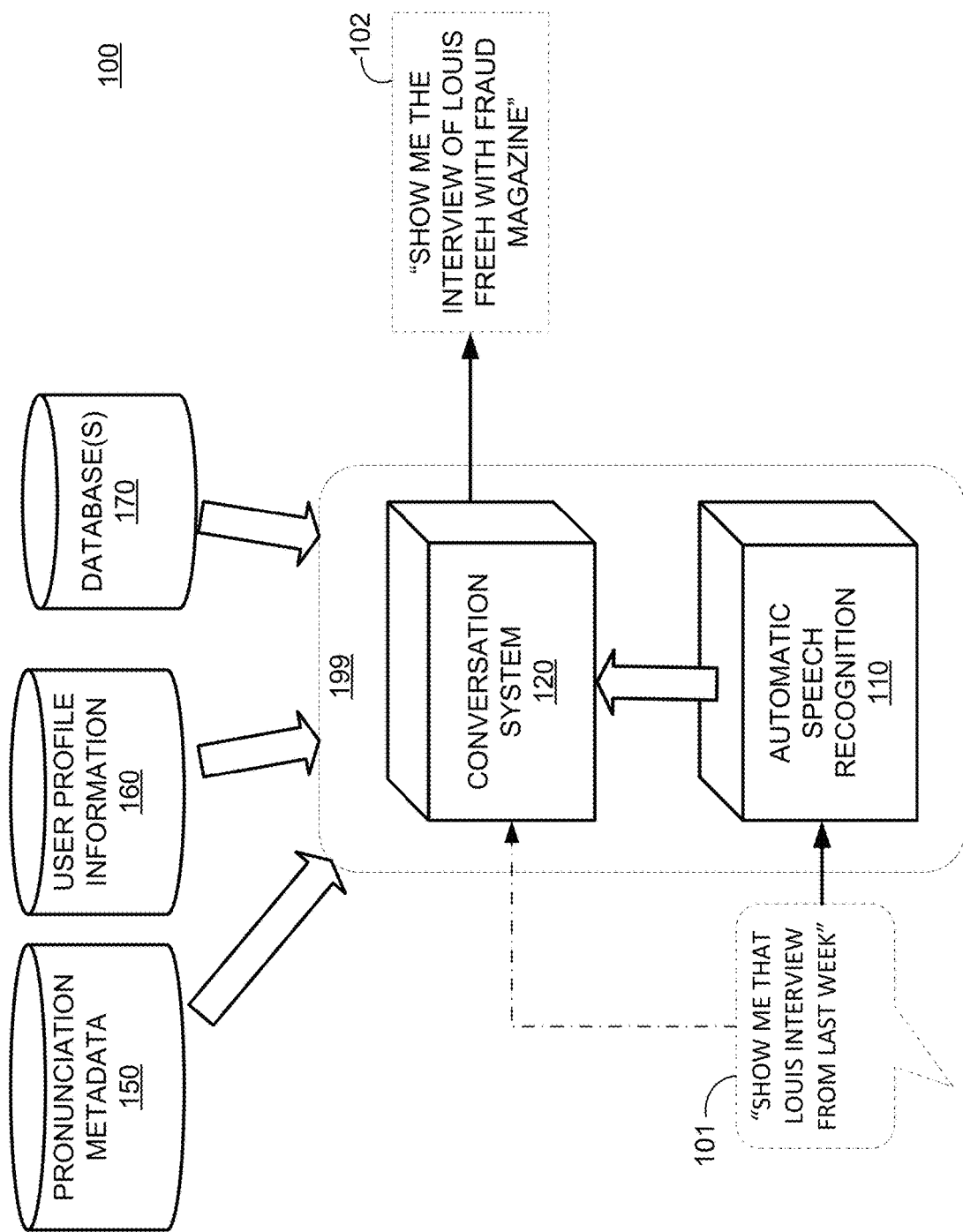
FIG. 1 shows a block diagram of an illustrative system for generating a text query, in accordance with some embodiments of the present disclosure.

In some embodiments, the present disclosure is directed to a system configured to receive a voice query from a user, analyze the voice query, and generate a text query (e.g., the translation) for searching for content or information. The system responds to the voice query based in part on pronunciation of one or more keywords. For example, in the English language, there are multiple words having the same spelling but different pronunciations. This may be especially true with the names of people. Some examples include:

| Name | Pronunciation 1 | Pronunciation 2 |
|---|---|---|
| LOUIS | loo-ee | loo-ihs |
| LEAH | lee-uh | lay-uh |
| HARRY | 'hæri | 'heri |
| ANTHONY | ant-uhnee | anth-uhnee |

To illustrate, a user may voice "Show me the interview of Louis" to an audio interface of the system. The system may generate the illustrative text queries such as:

Option 1) "Show me the interview of Louis Freeh with Fraud Magazine"

Option 2) "Show me the interview of Lewis Black that aired on CBS"

The resulting text query depends on how the user has spoken the word "Louis." If user pronounced "LOO-ee" then the system selects option 1 or applies more weighting to option 1. If user pronounced "LOO-his" then the system selects option 2 or applies more weighting to option 2. Without pronunciation taken into account, the system likely would not be able to accurately respond to the voice query.

In some circumstances, a voice query that includes a partial name of a personality may cause ambiguity in detecting that person correctly (e.g., referred to as a "non-definitive personality search query"). For example, if the user voices "Show me movies with Tom" or "Show me the interview of Louis," then the system will have to determine which Tom or Louis/Louie/Lewis the user is asking about. In addition to pronunciation information, the system may analyze one or more contextual inputs such as, for example, user search history (e.g., previous queries and search results), user likes/dislikes/preferences (e.g., from a user's profile information), general trends (e.g., of a plurality of users), popularity (e.g., among a plurality of users), any other suitable information, or any combination thereof. The system retains the pronunciation information in a suitable form (e.g., in the text query itself, or in metadata associated with the text query) such that it is not lost after the automatic speech recognition (ASR) process.

In some embodiments, for pronunciation information to be used by the system, the information field among which the system searches must include pronunciation information for comparison to the query. For example, the information field may include information about entities that include pronunciation metadata. The system may perform a phonetic translation process, which takes the user's voice query as input and translates it to text, which when read back, sounds phonetically correct. The system may be configured to use the output of the phonetic translation process and pronunciation metadata to determine search results. In an illustrative example, pronunciation metadata stored for an entity may include:

| ID: | WIKI04556 |
|---|---|
| NAME: | Louis Farrakhan |
| PRONUNCIATION: | LOO-his FAH-rah-kahn |

In some embodiments, the present disclosure is directed to a system configured to receive a voice query from a user, analyze the voice query, and generate a text query (e.g., the translation) for searching for content or information. The information field among which the system searches includes pronunciation metadata, alternative text representations of an entity, or both. For example, a user fires a voice query to the system, and the system first converts the voice to text using an ASR module. The resulting text then forms the input to a conversation system (e.g., that performs action in response to the query). To illustrate, if the user says "show me Tom Cruise movies," then the ASR module converts the user's speech to text and fires the text query to the conversation system. If the entity corresponding to "Tom Cruise" is present in the data, the system matches it with the text 'Tom Cruise' and returns appropriate results (e.g., information about Tom Cruise, content featuring Tom Cruise or content identifiers thereof). When an entity is present in data (e.g., of the information field) and can be accessed directly using the entity title, the entity may be referred to as being "reachable." Reachability is of prime importance for systems performing search operations. For example, if some data (e.g., a movie, artist, television series, or other entity) is present in the system, and associated data stored, but the user can't access that information, then the entity may be termed "unreachable." Unreachable entities in a data system represent a failure of the search system.

FIG. 1 shows a block diagram of illustrative system 100 for generating a text query, in accordance with some embodiments of the present disclosure. System 100 includes ASR module 110, conversation system 120, pronunciation metadata 150, user profile information 160 and one or more databases 170. For example, ASR module 110 and conversation system 120, which together may be included in system 199, may be used to implement a query application.

A user may voice query 101 which includes speech "Show me that Louis interview from last week" to an audio interface of system 199. ASR module 110 is configured to sample, condition, and digitize the received audio input and analyze the resulting audio file to generate a text query. In some embodiments, ASR module 110 retrieves information from user profile information 160 to help generate the text query. For example, voice recognition information for the user may be stored in user profile information 160, and ASR module 110 may use voice recognition information to identify the speaking user. In a further example, system 199 may include user profile information 160, stored in suitable memory. ASR module 110 may determine pronunciation information for the voiced word "Louis." Because there are more than one pronunciation for the text word "Louis," system 199 generates the text query based on the pronunciation information. Further, the sound "Loo-his" can be converted to text as "Louis" or "Lewis," and accordingly contextual information may help in identifying the correct entity of the voice query (e.g., Lewis as in Lewis Black, as opposed to Louis as in Louis Farrakhan). In some embodiments, conversation system 120 is configured to generate the text query, respond to the text query, or both, based on the recognized words from ASR module 110, contextual information, user profile information 160, pronunciation metadata 150, one or more databases 170, any other information, or any combination thereof. For example, conversation system 120 may generate a text query and then compare with text query with pronunciation metadata 150 for a plurality of entities to determine a match. In a further example, conversation system 120 may compare one or more recognized words to pronunciation metadata 150 for a plurality of entities to determine a match and then generate the text query based on the identified entity. In some embodiments, conversation system 120 generates a text query with accompanying pronunciation information. In some embodiments, conversation system 120 generates a text query with embedded pronunciation information. For example, the text query may include a phonetic representation of a word such as "loo-ee" rather than a correct grammatical representation "Louis." In a further example, pronunciation metadata 150 may include one or more reference phonetic representations with which the text query may be compared.

User profile information 160 may include user identification information (e.g., name, an identifier, address, contact information), user search history (e.g., previous voice queries, previous text queries, previous search results, feedback on previous search results or queries), user preferences (e.g., search settings, favorite entities, keywords included in more than one query), user likes/dislikes (e.g., entities followed by a user in a social media application, user inputted information), other users connected to the user (e.g., friends, family members, contacts in a social networking application, contacts stored in a user device), user voice data (e.g., audio samples, signatures, speech patterns, or files for identifying the user's voice), any other suitable information about a user, or any combination thereof.

One or more databases 170 include any suitable information for generating a text query, responding to a text query, or both. In some embodiments, pronunciation metadata 150, user profile information 160, or both may be included in one or more databases 170. In some embodiments, one or more databases 170 include statistical information for a plurality of users (e.g., search histories, content consumption histories, consumption patterns). In some embodiments, one or more databases 170 include information about a plurality of entities including persons, places, objects, events, content items, media content associated with one or more entities, or a combination thereof.

Figure 2:
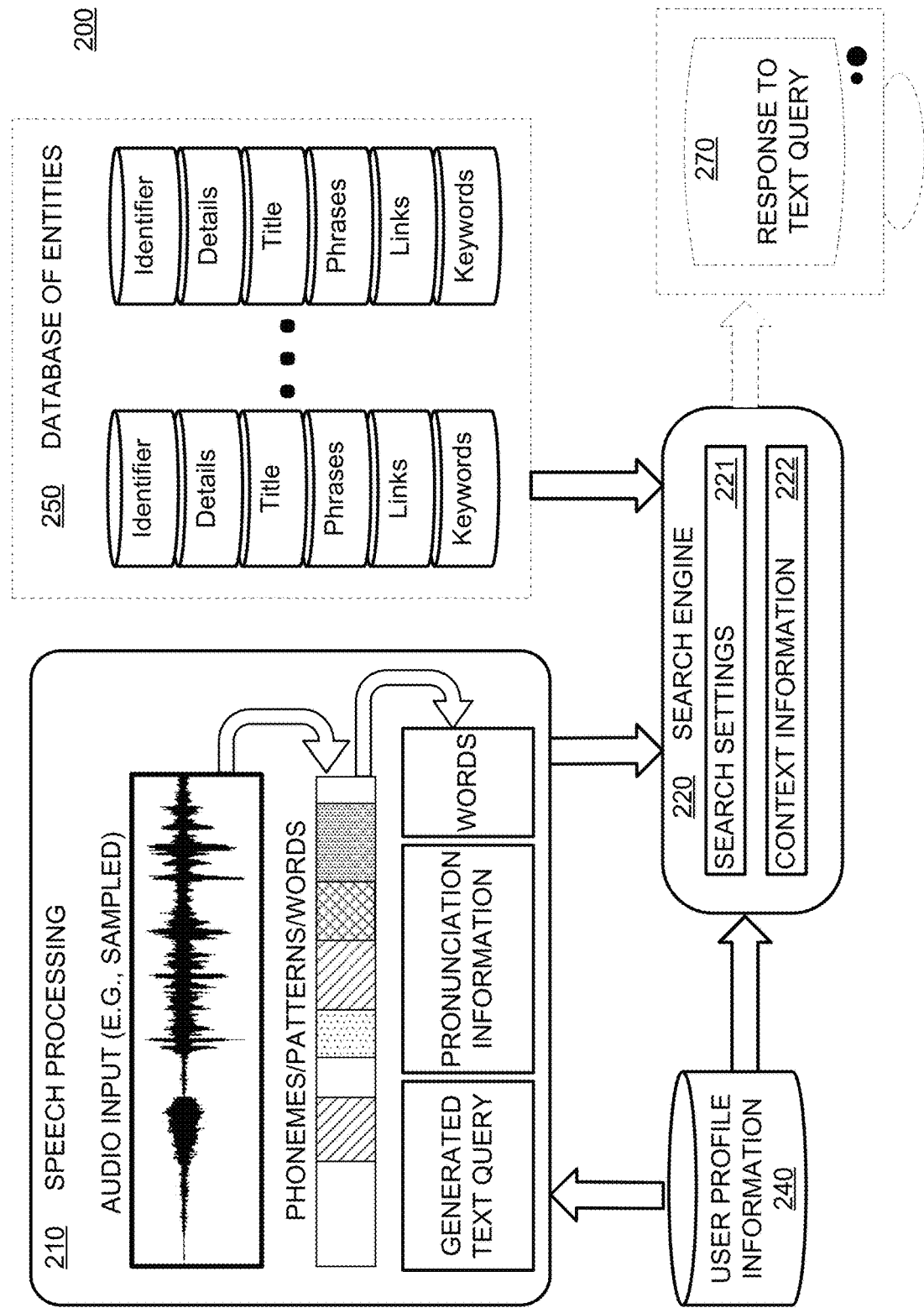
FIG. 2 shows a block diagram of an illustrative system for retrieving content in response to a voice query, in accordance with some embodiments of the present disclosure.

FIG. 2 shows a block diagram of illustrative system 200 for retrieving content in response to a voice query, in accordance with some embodiments of the present disclosure. System 200 includes speech processing system 210, search engine 220, entity database 250, and user profile information 240. Speech processing system 210 may identify an audio file and may analyze the audio file for phonemes, patterns, words, or other elements from which keywords may be identified. In some embodiments, speech processing system 210 may analyze an audio input in the time domain, spectral domain, or both to identify words. For example, speech processing system 210 may analyze the audio input in the time domain to determine periods of time during which speech occurs (e.g., to eliminate pauses or periods of silence). Speech processing system 210 may then analyze each period of time in the spectral domain to identify phonemes, patterns, words, or other elements from which keywords may be identified. Speech processing system 210 may output a generated text query, one or more words, pronunciation information, or a combination thereof. In some embodiments, speech processing system 210 may retrieve data from user profile information 240 for voice recognition, speech recognition, or both.

Search engine 220 receives the output from speech processing system 210, and, in combination with search settings 221 and context information 222, generates a response to a text query. Search engine 220 may use user profile information 240 to generate, modify, or respond to a text query. Search engine 220 searches among data of database of entities 250 using the text query. Database of entities 250 may include metadata associated with a plurality of entities, content associated with the plurality of entities, or both. For example, data may include an identifier for an entity, details describing an entity, a title referring to the entity (e.g., which may include a phonetic representation or alternative representation), phrases associated with the entity (e.g., which may include a phonetic representation or alternative representation), links (e.g., IP addresses, URLs, hardware addresses) associated with the entity, keywords associated with the entity (e.g., which may include a phonetic representation or alternative representation), any other suitable information associated with an entity, or any combination thereof. When search engine 220 identifies one or more entities that match keywords of the text query, identifies one or more content items that match keywords of the text query, or both, search engine 220 may then provide information, content, or both to the user as response 270 to the text query. In some embodiments, search settings 221 include which databases, entities, types of entities, types of content, other search criteria, or any combination thereof to affect the generation of the text query, the retrieval of the search results, or both. In some embodiments, context information 222 includes genre information (e.g., to further narrow the search field), keywords, database identification (e.g., which database likely includes the target information or content), types of content (e.g., by date, genre, title, format), any other suitable information, or any combination thereof. Response 270 may include, for example, content (e.g., a displayed video), information, a listing of search results, links to content, any other suitable search results, or any combination thereof.

Figure 3:
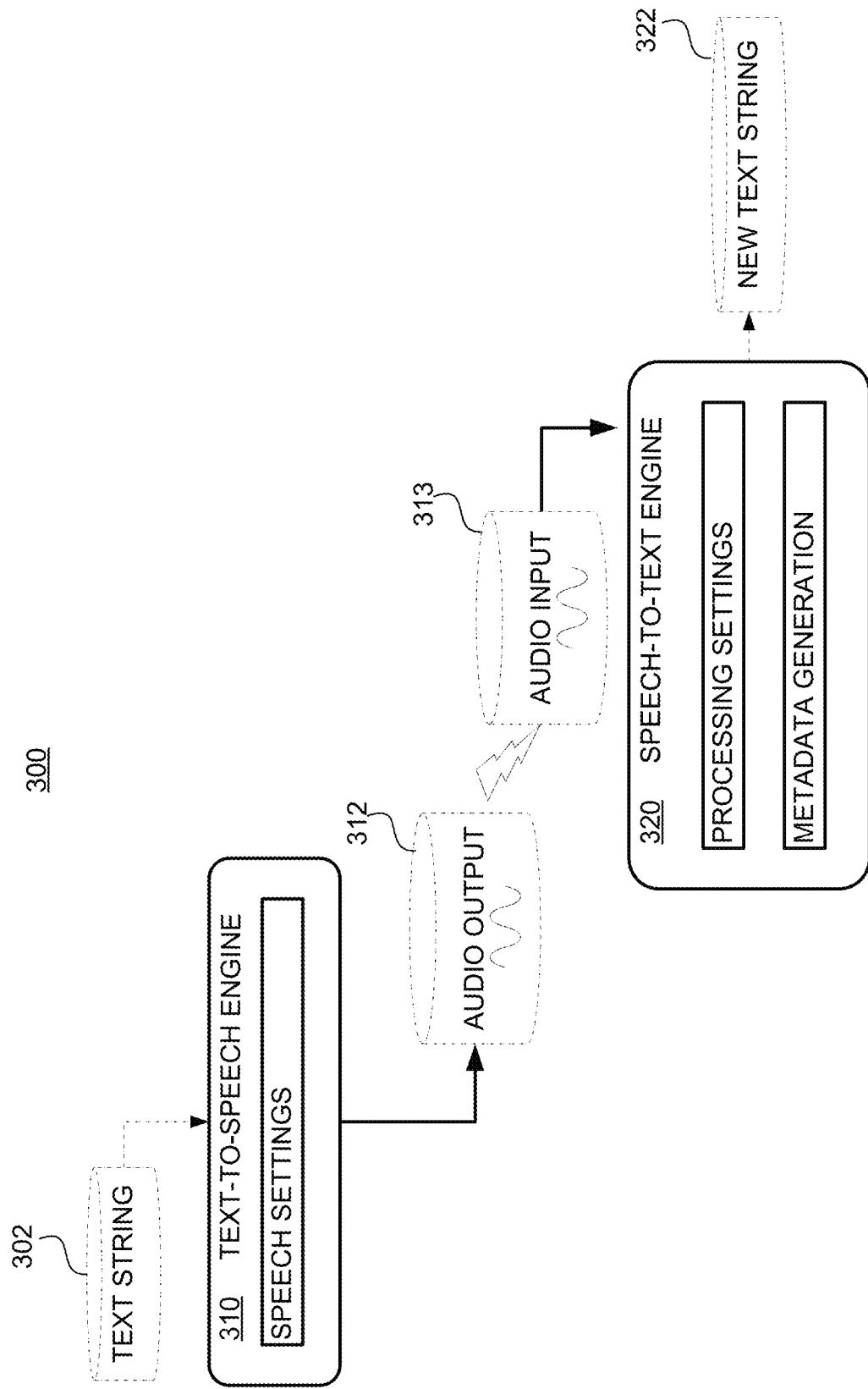
FIG. 3 shows a block diagram of an illustrative system for generating pronunciation information, in accordance with some embodiments of the present disclosure.

FIG. 3 shows a block diagram of illustrative system 300 for generating pronunciation information, in accordance with some embodiments of the present disclosure. System 300 includes text-to-speech engine 310 and speech-to-text engine 320. In some embodiments, system 300 determines pronunciation information independent of a text or voice query. For example, system 300 may generate metadata for one or more entities (e.g., such as pronunciation metadata 150 of system 100, or metadata stored in database of entities 250 of system 200). Text-to-speech engine 310 may identify a first text string 302, which may include an entity name or other identifier that is likely to be included in a voice query. For example, text-to-speech engine 310 may identify a "name" field of entity metadata rather than an "ID" field, since a user is more likely to speak a voice query including a name rather than a numeric or alphanumeric identifier (e.g., the user speaks "Louis" rather than "WIKI04556"). Text-to-speech engine 310 generates audio output 312, at a speaker or other audio device, based on the first text string. For example, text-to-speech engine 310 may use one or more settings to specify voice details (e.g., male/female voice, accents, or other details), playback speed, or any other suitable settings that may affect the generated audio output. Speech-to-text engine 320 receives an audio input 313 at a microphone or other suitable device from audio output 312 (e.g., in addition to or in place of an audio file that may be stored), and generates a text conversion of audio input 313 (e.g., in addition to or in place of storing an audio file of the recorded audio). Speech-to-text engine 320 may use processing settings to generate a new text string 322. New text string 322 is compared with first text string 302. If new text string 322 is identical to text string 302, then no metadata need be generated because a voice query may result in conversion to an accurate text query. If new text string 322 is not identical to text string 302, then this indicates that a voice query might be incorrectly converted to a text query. Accordingly, if new text string 322 is not identical to text string 302, then speech-to-text engine 320 includes new text string 322 in metadata associated with the entity that text string 302 is associated with. System 300 may identify a plurality of entities, and for each entity, generate metadata that includes resulting text strings (e.g., such as new text string 322) from text-to-speech engine 310 and speech-to-text engine 320. In some embodiments, for a given entity, text-to-speech engine 310, speech-to-text engine 320, or both may use more than one setting to generate more than one new text string. Accordingly, since the more than one text strings are different from text string 302, then each new text string may be stored in the metadata. For example, different pronunciations or interpretations of pronunciations arising from different settings may generate different new text strings, which may be stored in preparation for voice queries from different users. By generating and storing alternative representations (e.g., text string 302 and new text string 322), system 300 may update metadata to allow more accurate searching (e.g., improve the reachability of entities, and the accuracy of searching).

In an illustrative example, for an entity, system 300 may identify the title and related phrases, pass each phrase to text-to-speech engine 310 and save the respective audio files, and then pass each respective audio file to speech-to-text engine 320 to get an ASR transcript (e.g., new text string 322). If the ASR transcript is different from the original phrase (e.g., text string 302), system 300 adds the ASR transcript to the related phrases of the entity (e.g., as stored in the metadata). In some embodiments, system 300 does not require any manual work, and may be fully automated (e.g., no user input is required). In some embodiments, when a user fires a query and does not get the desired result, system 300 is alerted. In response, a person manually identifies what should have been the correct entity for the query. The incorrect result is stored and provides information for future queries. System 300 addresses the potential inaccuracy at the metadata level rather than the system level. The analysis of text strings 302 for many entities may be exhaustive and automatic, so that all wrong cases are identified beforehand (e.g., prior to a user's voice query) and are resolved. System 300 does not require a user to provide the voice query to generate a wrong case (e.g., an alternative representation). System 300 may be used to emulate a user's interaction with a query system to forecast potential sources of error in performing searches.

A user may access content, an application (e.g., for interpreting a voice query), and other features from one or more of their devices (i.e., user equipment or audio equipment), one or more network-connected devices, one or more electronic devices having a display, or a combination thereof, for example. Any of the illustrative techniques of the present disclosure may be implemented by a user device, a device providing a display to a user, or any other suitable control circuitry configured to respond to a voice query and generate a display content to a user.

Figure 4:
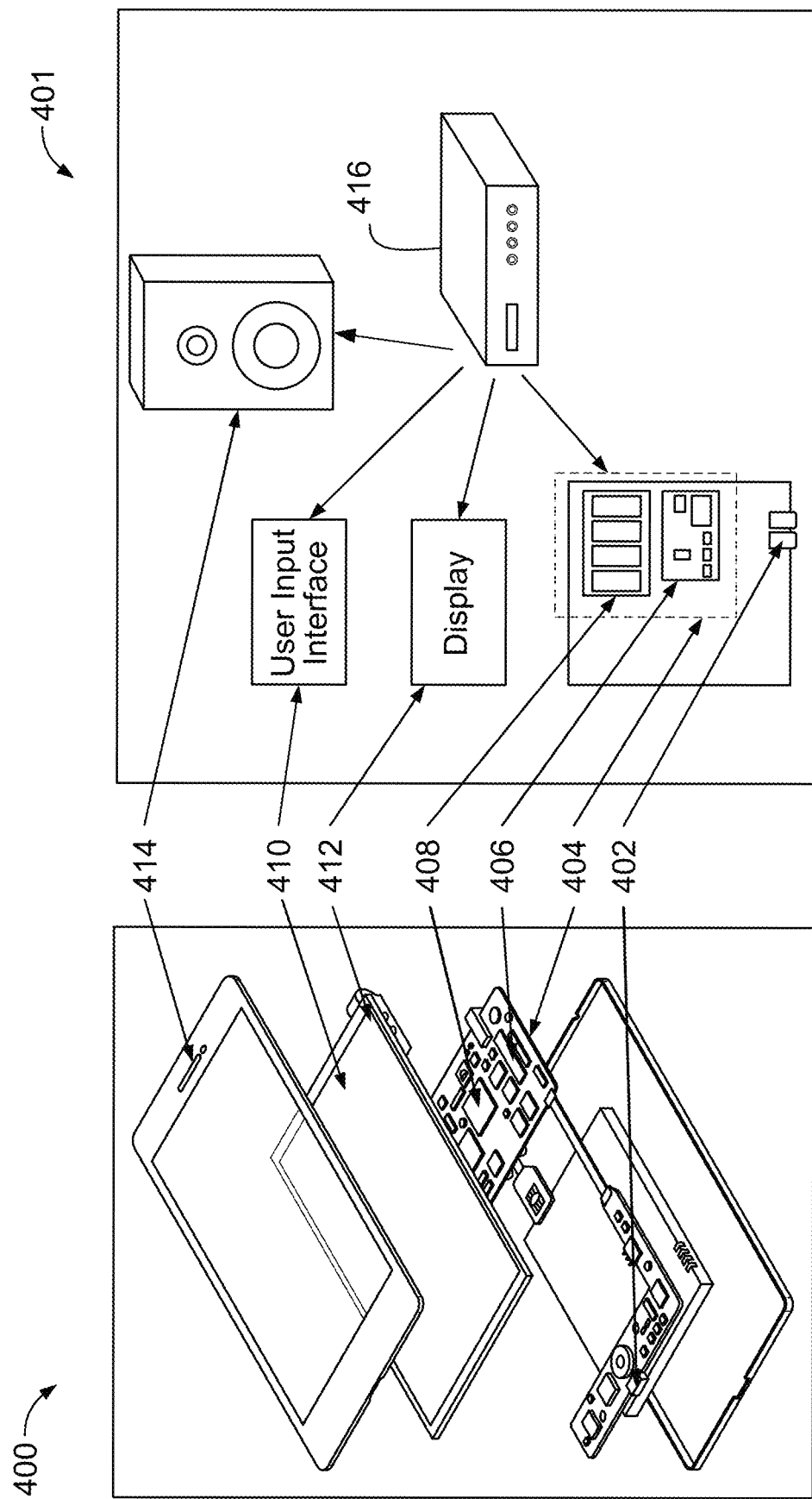
FIG. 4 is a block diagram of an illustrative user equipment, in accordance with some embodiments of the present disclosure.

FIG. 4 shows generalized embodiments of an illustrative user device. User equipment system 401 may include set-top box 416 that includes, or is communicatively coupled to, display 412, audio equipment 414, and user input interface 410. In some embodiments, display 412 may include a television display or a computer display. In some embodiments, user input interface 410 is a remote-control device. Set-top box 416 may include one or more circuit boards. In some embodiments, the one or more circuit boards include processing circuitry, control circuitry, and storage (e.g., RAM, ROM, hard disk, removable disk, etc.). In some embodiments, circuit boards include an input/output path. Each one of user equipment device 400 and user equipment system 401 may receive content and data via input/output (hereinafter "I/O") path 402. I/O path 402 may provide content and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths but are shown as a single path in FIG. 4 to avoid overcomplicating the drawing. While set-top box 416 is shown in FIG. 4 for illustration, any suitable computing device having processing circuitry, control circuitry, and storage may be used in accordance with the present disclosure. For example, set-top box 416 may be replaced by, or complemented by, a personal computer (e.g., a notebook, a laptop, a desktop), a network-based server hosting a user-accessible client device, a non-user-owned device, any other suitable device, or any combination thereof.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry is distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for an application stored in memory (e.g., storage 408). Specifically, control circuitry 404 may be instructed by the application to perform the functions discussed above and below. For example, the application may provide instructions to control circuitry 404 to generate the media guidance displays. In some implementations, any action performed by control circuitry 404 may be based on instructions received from the application.

In some client/server-based embodiments, control circuitry 404 includes communications circuitry suitable for communicating with an application server or other networks or servers. The instructions for carrying out the above-mentioned functionality may be stored on the application server. Communications circuitry may include a cable modem, an integrated-services digital network (ISDN) modem, a digital subscriber line (DSL) modem, a telephone modem, an ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other (described in more detail below).

Memory may be an electronic storage device such as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, solid state devices, quantum storage devices, gaming consoles, gaming media, any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, for example, may be used to supplement storage 408 or instead of storage 408.

A user may send instructions to control circuitry 404 using user input interface 410. User input interface 410, display 412, or both may include a touchscreen configured to provide a display and receive haptic input. For example, the touchscreen may be configured to receive haptic input from a finger, a stylus, or both. In some embodiments, equipment device 400 may include a front-facing screen and a rear-facing screen, multiple front screens, or multiple angled screens. In some embodiments, user input interface 410 includes a remote-control device having one or more microphones, buttons, keypads, any other components configured to receive user input, or combinations thereof. For example, user input interface 410 may include a handheld remote-control device having an alphanumeric keypad and option buttons. In a further example, user input interface 410 may include a handheld remote-control device having a microphone and control circuitry configured to receive and identify voice commands and transmit information to set-top box 416.

Audio equipment 414 may be provided as integrated with other elements of each one of user device 400 and user equipment system 401 or may be stand-alone units. The audio component of videos and other content displayed on display 412 may be played through speakers of audio equipment 414. In some embodiments, the audio may be distributed to a receiver (not shown), which processes and outputs the audio via speakers of audio equipment 414. In some embodiments, for example, control circuitry 404 is configured to provide audio cues to a user, or other audio feedback to a user, using speakers of audio equipment 414. Audio equipment 414 may include a microphone configured to receive audio input such as voice commands and speech (e.g., including voice queries). For example, a user may speak letters or words that are received by the microphone and converted to text by control circuitry 404. In a further example, a user may voice commands that are received by the microphone and recognized by control circuitry 404.

An application (e.g., for managing voice queries) may be implemented using any suitable architecture. For example, a stand-alone application may be wholly implemented on each one of user device 400 and user equipment system 401. In some such embodiments, instructions for the application are stored locally (e.g., in storage 408), and data for use by the application is downloaded on a periodic basis (e.g., from an out-of-band feed, from an Internet resource, or using another suitable approach). Control circuitry 404 may retrieve instructions for the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected. An application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media card, register memory, processor cache, Random Access Memory (RAM), etc.

In some embodiments, the application is a client/server-based application. Data for use by a thick or thin client implemented on each one of user device 400 and user equipment system 401 is retrieved on demand by issuing requests to a server remote from each one of user equipment device 400 and user equipment system 401. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on user device 400. This way, the processing of the instructions is performed remotely by the server while the resulting displays, which may include text, a keyboard, or other visuals, are provided locally on user device 400. User device 400 may receive inputs from the user via input interface 410 and transmit those inputs to the remote server for processing and generating the corresponding displays. For example, user device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to user device 400 for presentation to the user.

In some embodiments, the application is downloaded and interpreted or otherwise run by an interpreter or virtual machine (e.g., run by control circuitry 404). In some embodiments, the application may be encoded in the ETV Binary Interchange Format (EBIF), received by control circuitry 404 as part of a suitable feed, and interpreted by a user agent running on control circuitry 404. For example, the application may be an EBIF application. In some embodiments, the application may be defined by a series of JAVA-based files that are received and run by a local virtual machine or other suitable middleware executed by control circuitry 404.

Figure 5:
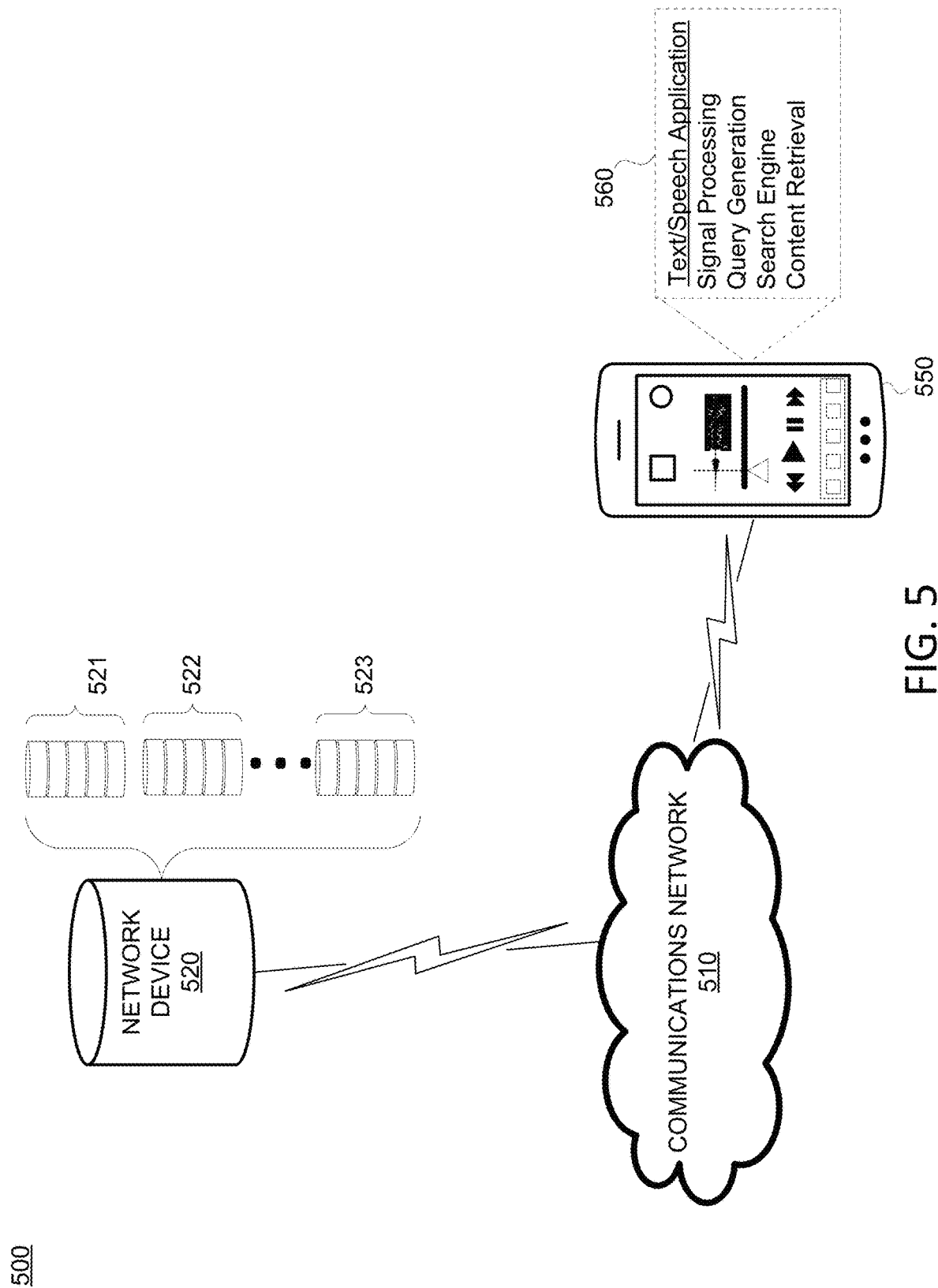
FIG. 5 shows a block diagram of an illustrative system for responding to a voice query, in accordance with some embodiments of the present disclosure.

FIG. 5 shows a block diagram of illustrative network arrangement 500 for responding to a voice query, in accordance with some embodiments of the present disclosure. Illustrative system 500 may be representative of circumstances in which a user provides a voice query at user device 550, views content on a display of user device 550, or both. In system 500, there may be more than one type of user device, but only one is shown in FIG. 5 to avoid overcomplicating the drawing. In addition, each user may utilize more than one type of user device and also more than one of each type of user device. User device 550 may be the same as user device 400 of FIG. 4, user equipment system 401, any other suitable device, or any combination thereof.

User device 550, illustrated as a wireless-enabled device, may be coupled to communications network 510 (e.g., connected to the Internet). For example, user device 550 is coupled to communications network 510 via a communications path (e.g., which may include an access point). In some embodiments, user device 550 may be a computing device coupled to communications network 510 via a wired connection. For example, user device 550 may also include wired connections to a LAN, or any other suitable communications link to network 510. Communications network 510 may be one or more networks including the Internet, a mobile phone network, mobile voice or data network (e.g., a 4G or LTE network), cable network, public switched telephone network, or other types of communications network or combinations of communications networks. Communications paths may include one or more communications paths, such as a satellite path, a fiber-optic path, a cable path, a path that supports Internet communications, free-space connections (e.g., for broadcast or other wireless signals), or any other suitable wired or wireless communications path or combination of such paths. Although communications paths are not drawn between user device 550 and network device 520, these devices may communicate directly with each other via communications paths, such as those described above, as well as other short-range point-to-point communications paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. Devices may also communicate with each other directly through an indirect path via communications network 510.

System 500, as illustrated, includes network device 520 (e.g., a server or other suitable computing device) coupled to communications network 510 via a suitable communications path. Communications between network device 520 and user device 550 may be exchanged over one or more communications paths but are shown as a single path in FIG. 5 to avoid overcomplicating the drawing. Network device 520 may include a database, one or more applications (e.g., as an application server, host server). A plurality of network entities may exist and be in communication with network 510, but only one is shown in FIG. 5 to avoid overcomplicating the drawing. In some embodiments, network device 520 may include one source device. In some embodiments, network device 520 implements an application that communicates with instances of applications at many user devices (e.g., user device 550). For example, an instance of a social media application may be implemented on user device 550, with application information being communicated to and from network device 520, which may store profile information for the user (e.g., so that a current social media feed is available on other devices than user device 550). In a further example, an instance of a search application may be implemented on user device 550, with application information being communication to and from network device 520, which may store profile information for the user, search histories from a plurality of users, entity information (e.g., content and metadata), any other suitable information, or any combination thereof.

In some embodiments, network device 520 includes one or more types of stored information, including, for example, entity information, metadata, content, historical communications and search records, user preferences, user profile information, any other suitable information, or any combination thereof. Network device 520 may include an applications-hosting database or server, plug-ins, a software developers kit (SDK), an applications programming interface (API), or other software tools configured to provide software (e.g., as downloaded to a user device), run software remotely (e.g., hosting applications accessed by user devices), or otherwise provide applications support to applications of user device 550. In some embodiments, information from network device 520 is provided to user device 550 using a client/server approach. For example, user device 550 may pull information from a server, or a server may push information to user device 550. In some embodiments, an application client residing on user device 550 may initiate sessions with network device 520 to obtain information when needed (e.g., when data is out-of-date or when a user device receives a request from the user to receive data). In some embodiments, information may include user information (e.g., user profile information, user-created content). For example, the user information may include current and/or historical user activity information such as what content transactions the user engages in, searches the user has performed, content the user has consumed, whether the user interacts with a social network, any other suitable information, or any combination thereof. In some embodiments, the user information may identify patterns of a given user for a period of time. As illustrated, network device 520 includes entity information for a plurality of entities. Entity information 521, 522, and 523 include metadata for the respective entities. Entities for which metadata is stored in network device 520 may be linked to each other, may be referenced to each other, may be described by one or more tags in metadata, or a combination thereof.

In some embodiments, an application may be implemented on user device 550, network device 520, or both. For example, the application may be implemented as software or a set of executable instructions, which may be stored in storage of the user device 550, network device 520, or both and executed by control circuitry of the respective devices. In some embodiments, an application may include an audio recording application, a speech-to-text application, a text-to-speech application, a voice-recognition application, or a combination thereof, that is implemented as a client/server-based application, where only a client application resides on user device 550, and a server application resides on a remote server (e.g., network device 520). For example, an application may be implemented partially as a client application on user device 550 (e.g., by control circuitry of user device 550) and partially on a remote server as a server application running on control circuitry of the remote server (e.g., control circuitry of network device 520). When executed by control circuitry of the remote server, the application may instruct the control circuitry to generate a display and transmit the generated display to user device 550. The server application may instruct the control circuitry of the remote device to transmit data for storage on user device 550. The client application may instruct control circuitry of the receiving user device to generate the application displays.

In some embodiments, the arrangement of system 500 is a cloud-based arrangement. The cloud provides access to services, such as information storage, searching, messaging, or social networking services, among other examples, as well as access to any content described above, for user devices. Services can be provided in the cloud through cloud-computing service providers, or through other providers of online services. For example, the cloud-based services can include a storage service, a sharing site, a social networking site, a search engine, or other services via which user-sourced content is distributed for viewing by others on connected devices. These cloud-based services may allow a user device to store information to the cloud and to receive information from the cloud rather than storing information locally and accessing locally stored information. Cloud resources may be accessed by a user device using, for example, a web browser, a messaging application, a social media application, a desktop application, or a mobile application, and may include an audio recording application, a speech-to-text application, a text-to-speech application, a voice-recognition application and/or any combination of access applications of the same. User device 550 may be a cloud client that relies on cloud computing for application delivery, or user device 550 may have some functionality without access to cloud resources. For example, some applications running on user device 550 may be cloud applications (e.g., applications delivered as a service over the Internet), while other applications may be stored and run on user device 550. In some embodiments, user device 550 may receive information from multiple cloud resources simultaneously.

In an illustrative example, a user may speak a voice query to user device 550. The voice query is recorded by an audio interface of user device 550, sampled and digitized by application 560, and converted to a text query by application 560. Application 560 may also include pronunciation along with the text query. For example, one or more words of the text query may be represented by phonetic symbols rather than a proper spelling. In a further example, pronunciation metadata may be stored with the text query, including a phonetic representation of one or more words of the text query. In some embodiments, application 560 transmits the text query and any suitable pronunciation information to network device 520 for searching among a database of entities, content, metadata, or a combination thereof. Network device 520 may identify an entity associated with the text query, content associated with the text query, or both and provide that information to user device 550.

For example, the user may speak "Show me Tom Cruise movies please" to a microphone of user device 550. Application 560 may generate a text query "Tom Cruise movies" and transmit the text query to network device 520. Network device 520 may identify entity "Tom Cruise" and then identify movies linked to the entity. Network device 520 may then transmit content (e.g., video files, trailers, or clips), content identifiers (e.g., movie titles and images), content addresses (e.g., URLs, websites, or IP addresses), any other suitable information, or any combination thereof to user device 550. Because the pronunciations of "Tom" and "Cruise" are generally not ambiguous, application 560 need not generate pronunciation information in this circumstance.

In a further example, the user may speak "Show me the interview with Louis" to a microphone of user device 550, wherein the user pronounces the name Louis as "loo-ee" rather than "loo-ihs." In some embodiments, application 560 may generate a text query "interview with Louis" and transmit the text query to network device 520, along with metadata that includes a phonetic representation as "loo-ee." In some embodiments, application 560 may generate a text query "interview with Loo-ee" and transmit the text query to network device 520, wherein the text query itself includes the pronunciation information (e.g., a phonetic representation in this example). Because the name Louis is common, there may be many entities that include this identifier. In some embodiments, network device 520 may identify entities having metadata that includes a pronunciation tag having "loo-ee" as a phonetic representation. In some embodiments, network device 520 may retrieve trending searches, search history of the user, or other contextual information to identify which entity the user is likely referring to. For example, the user may have searched "FBI" previously, and the entity Louis Freeh (e.g., former director of the FBI) may include metadata that includes a tag for "FBI." Once the entity is identified, network device 520 may then transmit content (e.g., video files or clips of interviews), content identifiers (e.g., file titles and still images from interviews), content addresses (e.g., URL, website, or IP addresses to stream one or more video files of interviews), any other suitable information related to Louis Freeh, or any combination thereof to user device 550. Because the pronunciation of "Louis" may be ambiguous, application 560 may generate pronunciation information in such circumstances.

In an illustrative example, a user may speak "William Djoko" to a microphone of user device 550. Application 560 may generate a text query, which may not correspond to the correct spelling of the entity. For example, the voice query "William Djoko" may be converted to text as "William gjoka." This incorrect text translation may result in difficulty in identifying the correct entity. In some embodiments, metadata associated with entity William Djoko includes alternative representations based on pronunciation. The metadata for entity "William Djoko" may include pronunciation tags (e.g., "related phrases") as shown in Table 1.

TABLE 1

Illustrative metadata for an entity, including alternative representations.

| | |
|---|---|
| ID: | MN0001001577 |
| TYPE: | Music artist |
| TITLE: | William Djoko |
| RELATED PHRASES: | William Kouam Djoko, William Cohan Joker, William gjoka, William joko |
| PRONUNCIATION: | Wiljəm Jō-kō |
| LINKS: | { } |

Because the text query may include an incorrect spelling, but the metadata associated with the correct entity includes variations, the correct entity may be identified. Accordingly, network device 520 may include entity information including alternate representations, and thus may identify the correct entity in response to a text query including the phrase "William gjoka." Once the entity is identified, network device 520 may then transmit content (e.g., audio or video files clips), content identifiers (e.g., song or album titles and still images from concerts), content addresses (e.g., URL, website, or IP addresses to stream one or more audio files of music), any other suitable information related to William Djoko, or any combination thereof to user device 550. Because the name "Djoko" may be incorrectly translated from speech, application 560 may generate pronunciation information for storage in metadata in such circumstances to identify the correct entity.

In the illustrative example above, the reachability of entity William Djoko is improved by storing alternative representations, especially since the ASR process may result in a grammatically incorrect text conversion of the entity name.

In an illustrative example, metadata may be generated based on pronunciation for later reference (e.g., by text query or other search and retrieval processes), rather than in response to a user's voice query. In some embodiments, network device 520, user device 550, or both may generate metadata based on pronunciation information. For example, user device 550 may receive user input of an alternative representation of an entity (e.g., based on previous search results or speech-to-text conversions). In some embodiments, network device 520, user device 550, or both may automatically generate metadata for an entity using a text-to-speech module and a speech-to-text module. For example, application 560 may identify a textual representation of an entity (e.g., a text string of the entity's name), and input the textual representation to the text-to-speech module to generate an audio file. In some embodiments, the text-to-speech module includes one or more settings or criteria with which the audio file is generated. For example, settings or criteria may include language (e.g., English, Spanish, Mandarin), accent (e.g., regional, or language-based), voice (e.g., a particular person's voice, a male voice, a female voice), speed (e.g., playback time of the relevant portion of the audio file), pronunciation (e.g., for multiple phonetic variations), any other suitable settings or criterion, or any combination thereof. Application 560 then inputs the audio file to a speech-to-text module to generate a resulting textual representation. If the resulting textual representation is not identical to the original textual representation, then application 560 may store the resulting textual representation in metadata associated with the entity. In some embodiments, application 560 may repeat this process for various settings or criteria, thus generating various textual representations that may be stored in the metadata. The resulting metadata includes the original textual representation along with variations generated using text-speech-text conversions to forecast likely variations. Accordingly, when application 560 receives a voice query from a user, and the translation to text does not exactly match an entity identifier, application 560 may still identify the correct entity. Further, application 560 need not analyze the text query for pronunciation information, as the metadata includes variations (e.g., analysis is performed upfront rather than in real time).

Application 560 may include any suitable functionality such as, for example, audio recording, speech recognition, speech-to-text conversion, text-to-speech conversion, query generation, search engine functionality, content retrieval, display generation, content presentation, metadata generation, database functionality, or a combination thereof. In some embodiments, aspects of application 560 are implemented across more than one device. In some embodiments, application 560 is implemented on a single device. For example, entity information 521, 522, and 523 may be stored in memory storage of user device 550, and may be accessed by application 560.

Figure 6:
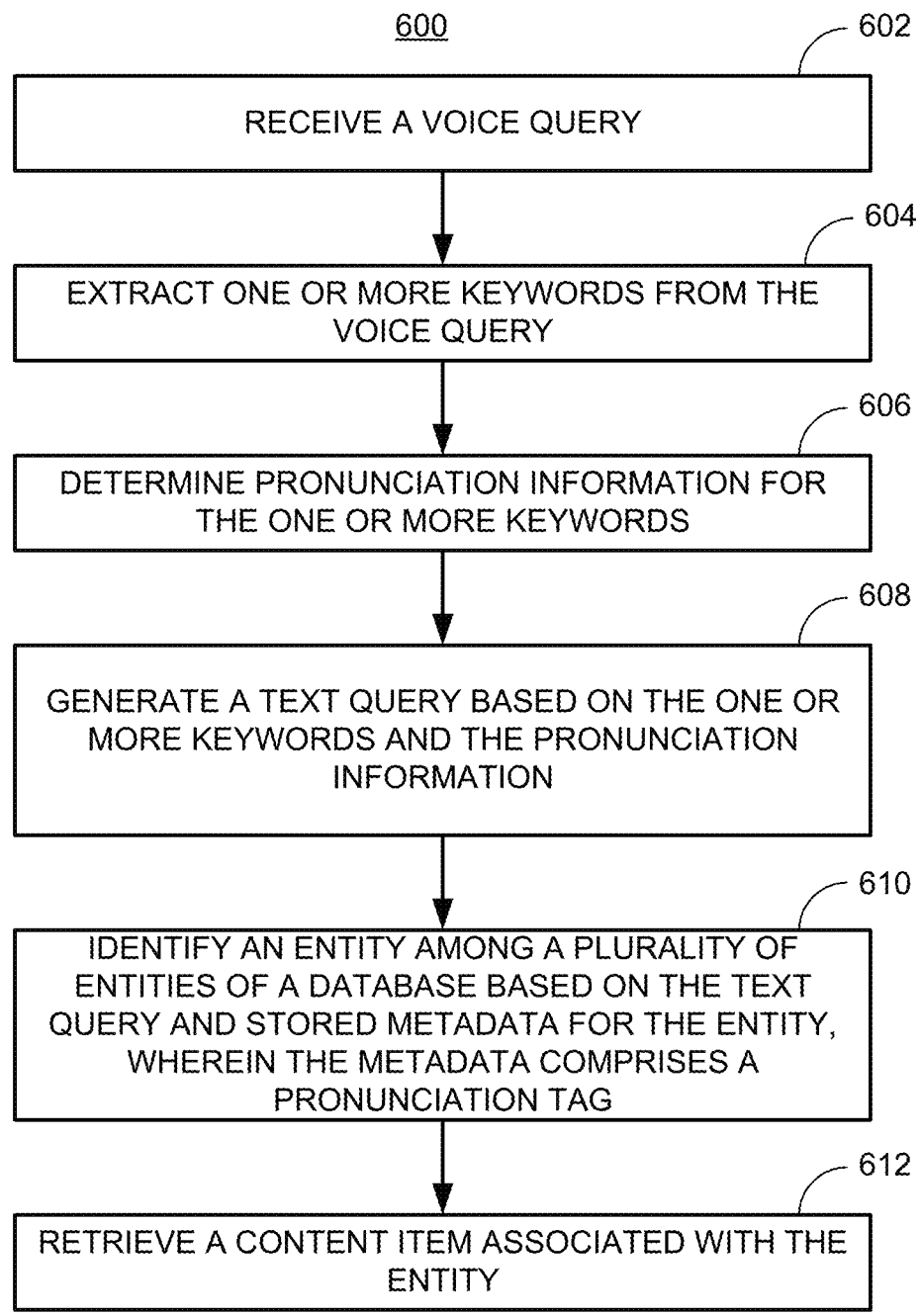
FIG. 6 shows a flowchart of an illustrative process for responding to a voice query based on pronunciation information, in accordance with some embodiments of the present disclosure.

FIG. 6 shows a flowchart of illustrative process 600 for responding to a voice query based on pronunciation information, in accordance with some embodiments of the present disclosure. For example, a query application may perform process 600, implemented on any suitable hardware such as user device 400 of FIG. 4, user equipment system 401 of FIG. 4, user device 550 of FIG. 5, network device 520 of FIG. 5, any other suitable device, or any combination thereof. In a further example, the query application may be an instance of application 560 of FIG. 5.

At step 602, the query application receives a voice query. In some embodiments, an audio interface (e.g., audio equipment 414, user input interface 410, or a combination thereof) may include a microphone or other sensor that receives audio input and generates an electronic signal. In some embodiments, the audio input is received at an analog sensor, which provides an analog signal that is conditioned, sampled, and digitized to generate an audio file. The audio file may then be analyzed by the query application at steps 604 and 606. In some embodiments, the audio file is stored in memory (e.g., storage 408). In some embodiments, the query application includes a user interface (e.g., user input interface 410), which allows a user to record, play back, alter, crop, visualize, or otherwise manage audio recording. For example, in some embodiments, the audio interface is always configured to receive audio input. In a further example, in some embodiments, the audio interface is configured to receive audio input when a user provides an indication to a user input interface (e.g., by selecting a soft button on a touchscreen to begin audio recording). In a further example, in some embodiments, the audio interface is configured to receive audio input and begins recording when speech or other suitable audio signals are detected. The query application may include any suitable conditioning software or hardware for converting audio input to a stored audio file. For example, the query application may apply one or more filters (e.g., low-pass, high-pass, notch filters, or band-pass filters), amplifiers, decimators, or other conditionings to generate the audio file. In a further example, the query application may apply any suitable processing to a conditioned signal to generate an audio file such as compression, transformation (e.g., spectral transformation, wavelet transformation), normalization, equalization, truncation (e.g., in a time or spectral domain), any other suitable processing, or any combination thereof. In some embodiments, at step 602, the control circuitry receives an audio file from a separate application, a separate module of the query application, based on a user input, or any combination thereof. For example, at step 602, the control circuitry may receive a voice query as an audio file stored in storage (e.g., storage 408), for further processing (e.g., steps 604-612 of process 600).

At step 604, the query application extracts one or more keywords from the voice query of step 602. In some embodiments, the one or more keywords may represent the full voice query. In some embodiments, the one or more keywords include only important words or parts of speech. For example, in some embodiments, the query application may identify words in speech, and select some of those words as keywords. For example, the query application may identify words, and among those words select words that are not prepositions. In a further example, the query application may identify as a keyword only a word that is at least three characters long. In a further example, the query application may identify keywords as a phrase including two or more words (e.g., to be more descriptive and provide more context), which may be helpful to narrow a potential search field of relevant content. In some embodiments, the query application identifies keywords such as, for example, words, phrases, names, places, channels, media asset titles, or other keywords, using any suitable criteria to identify keywords from an audio input. The query application may process words using any suitable word detection technique, speech detection technique, pattern recognition technique, signal processing technique, or any combination thereof. For example, the query application may compare a series of signal templates to a portion of an audio signal to find whether a match exists (e.g., whether a particular word is included in the audio signal). In a further example, the query application may apply a learning technique to better recognize words in voice queries. For example, the query application may gather feedback from a user on a plurality of requested content items in the context of a plurality of queries, and accordingly use past data as a training set for making recommendations and retrieving content. In some embodiments, the query application may store snippets (i.e., clips of short duration) of recorded audio during detected speech, and process the snippets. In some embodiments, the query application stores relatively large segments of speech (e.g., more than 10 seconds) as an audio file, and processes the file. In some embodiments, the query application may process speech to detect words by using a continuous computation. For example, a wavelet transform may be performed on speech in real time, providing a continuous, if slightly time-lagged, computation of speech patterns (e.g., which could be compared to a reference to identify words). In some embodiments, the query application may detect words, as well as which user uttered the words (e.g., voice recognition) in accordance with the present disclosure.

In some embodiments, at step 604, the query application adds detected words to a list of words detected in the query. In some embodiments, the query application may store these detected words in memory. For example, the query application may store in memory words as a collection of ASCII characters (i.e., 8-bit code), a pattern (e.g., indicating a speech signal reference used to match the word), an identifier (e.g., a code for a word), a string, any other datatype, or any combination thereof. In some embodiments, the media guidance application may add words to memory as they are detected. For example, the media guidance application may append a string of previously detected words with a newly detected word, add a newly detected word to a cell array of previously detect words (e.g., increase the cell array size by one), create a new variable corresponding to the newly detected word, create a new file corresponding to the newly created word, or otherwise store one or more words detected at step 604.

At step 606, the query application determines pronunciation information for the one or more keywords of step 604. In some embodiments, pronunciation information includes a phonetic representation (e.g., using the international phonetic alphabet) of the one or more keywords. In some embodiments, pronunciation information includes one or more alternative spellings of the one or more keywords to incorporate the pronunciation. In some embodiments, at step 606, the control circuitry generates metadata associated with the text query that includes a phonetic representation.

At step 608, the query application generates a text query based on the one or more keywords of step 604 and the pronunciation information of step 606. The query application may generate the text query by arranging the one or more keywords in a suitable order (e.g., in the order spoken). In some embodiments, the query application may omit one or more words of the voice query (e.g., short words, prepositions, or any other words determined to be relatively less important). The text query may be generated and stored in suitable storage (e.g., storage 408) as a file (e.g., a text file).

At step 610, the query application identifies an entity among a plurality of entities of a database based on the text query and stored metadata for the entity. In some embodiments, the metadata includes a pronunciation tag. In some embodiments, the query application may identify the entity by identifying a metadata tag of a content item that corresponds to an entity. For example, a content item may include a movie having a tag for an actor in the movie. If the text query includes the actor, then the query application may determine a match and may identify the entity as being associated with the content item based on the match. To illustrate, the query application may identify the entity first (e.g., search among entities), and then retrieve content associated with the entity, or the query application may identify content first (e.g., search among content) and determine whether the entity associated with the content matches the text query. Databases that are arranged by entity, content, or both may be searched by the query application.

In some embodiments, the query application identifies the entity based on user profile information. For example, the query application may identify the entity based on a previously identified entity from a previous voice query. In a further example, the query application may identify the entity based on popularity information associated with the entity (e.g., based on searches for a plurality of users). In some embodiments, the query application identifies the entity based on a user's preferences. For example, if one or more keywords match a preferred entity name or identifier of the user profile information, then the query application may identify that entity or more heavily weigh that entity.

In some embodiments, the query application identifies the entity by identifying the plurality of entities (e.g., with metadata stored for each entity), determining a respective score for each respective entity of the plurality of entities based on comparing the respective pronunciation tag with the text query, and selecting the entity by determining a maximum score. The score may be based on how many matches are identified between keywords of the text query and metadata associated with the entity or content item.

In some embodiments, the query application identifies more than one entity (e.g., an associated metadata) among the plurality of entities based on the text query. The query application may identify a content item that is associated with some or all of the entities of the query. In some embodiments, the query application identifies the entity by comparing at least a portion of the text query to tags of the stored metadata for each entity to identify a match.

At step 612, the query application retrieves a content item associated with the entity. In some embodiments, the query application identifies a content item, downloads a content item, streams a content item, generates for display a content item, or a combination thereof. For example, a voice query may include "Show me recent Tom Cruise movies" and the query application may provide a link to the move "Mission Impossible: Fallout" that the user can select to view the video content. In some embodiments, the query application may retrieve a plurality of content that is associated with entities matching the text query. For example, the query application may retrieve a plurality of links, video files, audio files, or other content, or a list of identified content items, in accordance with the present disclosure.

Figure 7:
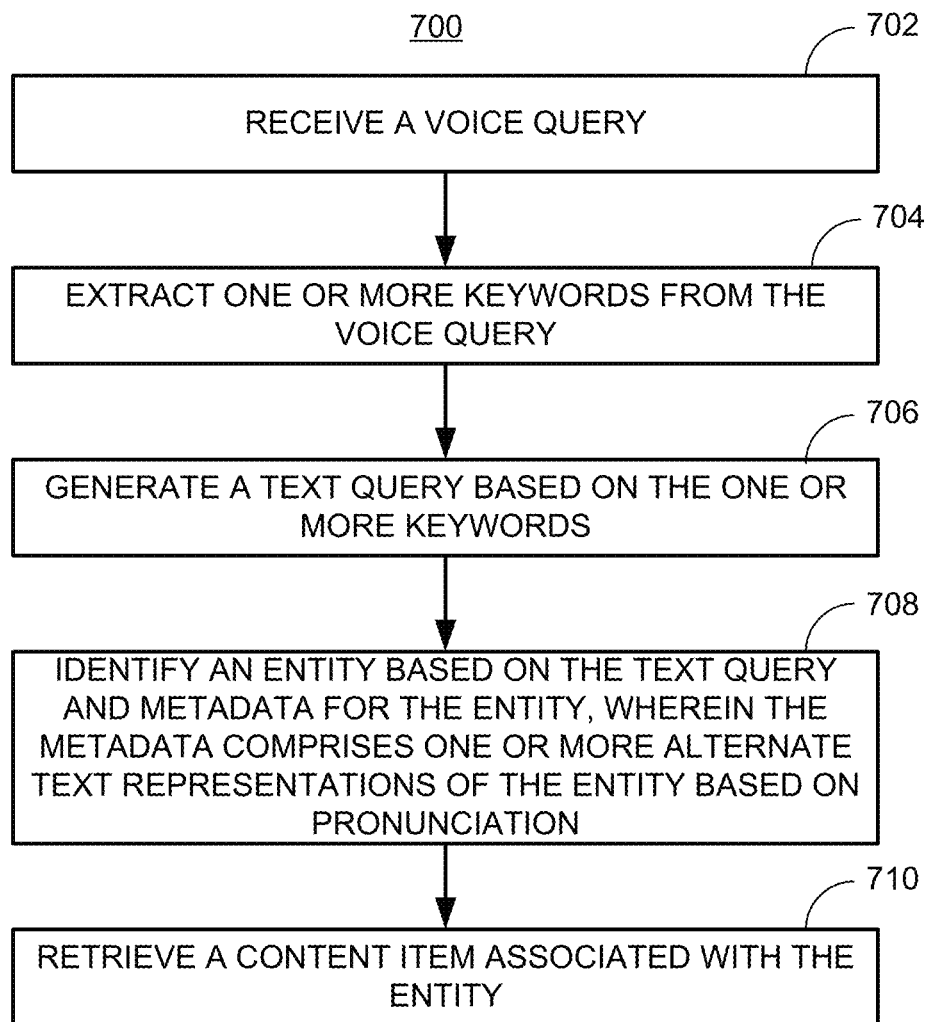
FIG. 7 shows a flowchart of an illustrative process for responding to a voice query based on alternate representations, in accordance with some embodiments of the present disclosure.

FIG. 7 shows a flowchart of illustrative process 700 for responding to a voice query based on alternate representations, in accordance with some embodiments of the present disclosure. For example, a query application may perform process 700, implemented on any suitable hardware such as user device 400 of FIG. 4, user equipment system 401 of FIG. 4, user device 550 of FIG. 5, network device 520 of FIG. 5, any other suitable device, or any combination thereof. In a further example, the query application may be an instance of application 560 of FIG. 5.

At step 702, the query application receives a voice query. In some embodiments, an audio interface (e.g., audio equipment 414, user input interface 410, or a combination thereof) may include a microphone or other sensor that receives audio input and generates an electronic signal. In some embodiments, the audio input is received at an analog sensor, which provides an analog signal that is conditioned, sampled, and digitized to generate an audio file. The audio file may then be analyzed by the query application at steps 704. In some embodiments, the audio file is stored in memory (e.g., storage 408). In some embodiments, the query application includes a user interface (e.g., user input interface 410), which allows a user to record, play back, alter, crop, visualize, or otherwise manage audio recording. For example, in some embodiments, the audio interface is always configured to receive audio input. In a further example, in some embodiments, the audio interface is configured to receive audio input when a user provides an indication to a user interface (e.g., by selecting a soft button on a touchscreen to begin audio recording). In a further example, in some embodiments, the audio interface is configured to receive audio input, and begins recording when speech or other suitable audio signals are detected. The query application may include any suitable conditioning software or hardware for converting audio input to a stored audio file. For example, the query application may apply one or more filters (e.g., low-pass, high-pass, notch filters, or band-pass filters), amplifiers, decimators, or other conditionings to generate the audio file. In a further example, the query application may apply any suitable processing to a conditioned signal to generate an audio file such as compression, transformation (e.g., spectral transformation, wavelet transformation), normalization, equalization, truncation (e.g., in a time or spectral domain), any other suitable processing, or any combination thereof. In some embodiments, at step 702, the control circuitry receives an audio file from a separate application, a separate module of the query application, based on a user input, or any combination thereof. For example, step 702 may include receiving a voice query as an audio file stored in storage (e.g., storage 408), for further processing (e.g., steps 704-710 of process 700).

At step 704, the query application extracts one or more keywords from the voice query of step 702. In some embodiments, the one or more keywords may represent the full voice query. In some embodiments, the one or more keywords include only important words or parts of speech. For example, in some embodiments, the query application may identify words in speech, and select some of those words as keywords. For example, the query application may identify words, and among those words select words that are not prepositions. In a further example, the query application may identify as a keyword only a word that is at least three characters long. In a further example, the query application may identify keywords as a phrase including two or more words (e.g., to be more descriptive and provide more context), which may be helpful to narrow a potential search field of relevant content. In some embodiments, the query application identifies keywords such as, for example, words, phrases, names, places, channels, media asset titles, or other keywords, using any suitable criteria to identify keywords from an audio input. The query application may process words using any suitable word detection technique, speech detection technique, pattern recognition technique, signal processing technique, or any combination thereof. For example, the query application may compare a series of signal templates to a portion of an audio signal to find whether a match exists (e.g., whether a particular word is included in the audio signal). In a further example, the query application may apply a learning technique to better recognize words in voice queries. For example, the query application may gather feedback from a user on a plurality of requested content items in the context of a plurality of queries, and accordingly use past data as a training set for making recommendations and retrieving content. In some embodiments, the query application may store snippets (i.e., clips with short durations) of recorded audio during detected speech, and process the snippets. In some embodiments, the query application stores relatively large segments of speech (e.g., more than 10 seconds) as an audio file, and processes the file. In some embodiments, the query application may process speech to detect words by using a continuous computation. For example, a wavelet transform may be performed on speech in real time, providing a continuous, if slightly time-lagged, computation of speech patterns (e.g., which could be compared to a reference to identify words). In some embodiments, the query application may detect words, as well as which user uttered the words (e.g., voice recognition) in accordance with the present disclosure.

In some embodiments, at step 704, the query application adds detected words to a list of words detected in the query. In some embodiments, the query application may store these detected words in memory. For example, the query application may store in memory words as a collection of ASCII characters (i.e., 8-bit code), a pattern (e.g., indicating a speech signal reference used to match the word), an identifier (e.g., a code for a word), a string, any other datatype, or any combination thereof. In some embodiments, the media guidance application may add words to memory as they are detected. For example, the media guidance application may append a string of previously detected words with a newly detected word, add a newly detected word to a cell array of previously detect words (e.g., increase the cell array size by one), create a new variable corresponding to the newly detected word, create a new file corresponding to the newly created word, or otherwise store one or more words detected at step 704.

At step 706, the query application generates a text query based on the one or more keywords of step 704. The query application may generate the text query by arranging the one or more keywords in a suitable order (e.g., in the order spoken). In some embodiments, the query application may omit one or more words of the voice query (e.g., short words, prepositions, or any other words determined to be relatively less important). The text query may be generated and stored in suitable storage (e.g., storage 408) as a file (e.g., a text file).

At step 708, the query application identifies an entity based on the text query and metadata for the entity. The metadata includes alternate text representations of the entity based on pronunciation. In some embodiments, the query application may identify the entity by identifying a metadata tag of a content item that corresponds to an alternate representation of an entity. For example, a content item may include a movie having a tag for an actor in the movie, wherein the tag includes an alternate spelling (e.g., derived from a system such as system 300, or otherwise included in the metadata). If the text query includes the actor, then the query application may determine a match and may identify the entity as being associated with the content item based on the match. To illustrate, the query application may identify the entity first (e.g., search among entities), and then retrieve content associated with the entity, or the query application may identify content first (e.g., search among content) and determine whether the entity associated with the content matches the text query. Databases that are arranged by entity, content, or both may be searched by the query application. The query application may determine a match when one or more words of the text query match an alternative representation of an entity (e.g., as stored in metadata associated with the entity).

In some embodiments, the query application identifies the entity based on user profile information. For example, the query application may identify the entity based on a previously identified entity from a previous voice query. In a further example, the query application may identify the entity based on popularity information associated with the entity (e.g., based on searches for a plurality of users). In some embodiments, the query application identifies the entity based on a user's preferences. For example, if one or more keywords match an alternative representation of a preferred entity name or identifier of the user profile information, then the query application may identify that entity or more heavily weigh that entity.

In some embodiments, the query application identifies the entity by identifying the plurality of entities (e.g., with metadata stored for each entity), determining a respective score for each respective entity of the plurality of entities based on comparing the respective metadata with the text query, and selecting the entity by determining a maximum score. The score may be based on how many matches are identified between keywords of the text query and metadata associated with the entity or content item.

In some embodiments, the query application identifies more than one entity (e.g., an associated metadata) among the plurality of entities based on the text query. The query application may identify a content item that is associated with some or all of the entities of the query. In some embodiments, the query application identifies the entity by comparing at least a portion of the text query to tags of the stored metadata for each entity to identify a match.

At step 710, the query application retrieves a content item associated with the entity. In some embodiments, the query application identifies a content item, downloads a content item, streams a content item, generates for display a content item, or a combination thereof. For example, a voice query may include "Show me recent Tom Cruise movies" and the query application may provide a link to the move "Mission Impossible: Fallout" that the user can select to view the video content. In some embodiments, the query application may retrieve a plurality of content that is associated with entities matching the text query. For example, the query application may retrieve a plurality of links, video files, audio files, or other content, or a list of identified content items, in accordance with the present disclosure.

Figure 8:
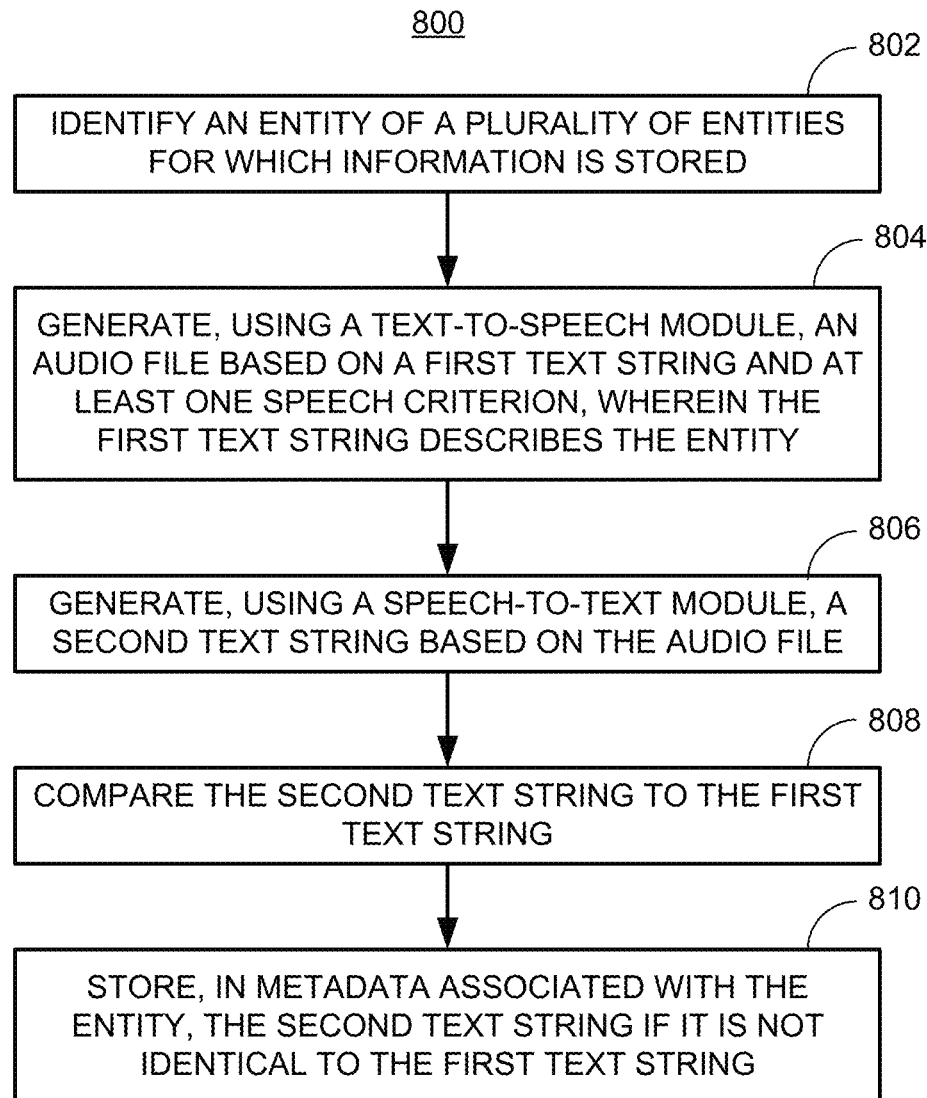
FIG. 8 shows a flowchart of an illustrative process for generating metadata for an entity based on pronunciation, in accordance with some embodiments of the present disclosure.

FIG. 8 shows a flowchart of illustrative process 800 for generating metadata for an entity based on pronunciation, in accordance with some embodiments of the present disclosure. For example, an application may perform process 800, implemented on any suitable hardware such as user device 400 of FIG. 4, user equipment system 401 of FIG. 4, user device 550 of FIG. 5, network device 520 of FIG. 5, any other suitable device, or any combination thereof. In a further example, the application may be an instance of application 560 of FIG. 5. In a further example, system 300 of FIG. 3 may perform illustrative process 800.

At step 802, the application identifies an entity of a plurality of entities for which information is stored. In some embodiments, the application selects an entity based on a predetermined order. For example, the application may select entities in alphabetical order to perform portions of process 800. In some embodiments, the application identifies the entity when the metadata for the entity is created. For example, the application may identify the entity when the entity is added to the database (e.g., database of entities). In some embodiments, the application identifies the entity when a search operation misidentifies an entity, and accordingly, an alternative representation may be desired to prevent further misidentifications. In some embodiments, the application identifies the entity based on user input. For example, the user may indicate to the application (e.g., at a suitable user interface) the entity based on an incorrect search result, an unreachable entity, or an observed error in the search results. In some embodiments, the application need not identify an entity in response to an error in search results or a predetermined order. For example, the application may randomly select entities of an entity database and proceed to step 804. In some embodiments, the application may identify an entity based on the entity's popularity in search queries. For example, greater search efficacy may be achieved by determining alternative representations for more popular entities such that more search queries are correctly responded to. In a further example, the application may identify less popular, or even obscure, entities to prevent unreachability of those entities since very few search queries may specify these entities. The application may apply any suitable criteria to determine which entity to identify. In some embodiments, the application may identify more than one entity at step 802, and accordingly steps 804-810 may be performed for each entity identified. In some embodiments, the application may identify a content item rather than, or in addition to, an entity. For example, the application may identify an entity such as a movie, and then identify every other important entity associated with that entity to undergo steps 804-810.

At step 804, the application generates an audio file based on a first text string and at least one speech criterion. The first text string describes the entity identified at step 802. For example, as illustrated in FIG. 3, the application may include text-to-speech engine 310, which may be configured to generate an audio file. The application may generate an audio output from a speaker or other suitable sound-generating device that may be detected by a microphone or other suitable detecting device. The application may apply one or more settings or speech criteria in generating and outputting the audio file. For example, aspects of the generated "voice" may be tuned or otherwise selected based on any suitable criteria. In some embodiments, the at least one speech criterion includes a pronunciation setting (e.g., how one or more syllables, letter groups, or words are pronounced, or which phonemes are to be used). In some embodiments, the at least one speech criterion includes a language setting (e.g., specifying a language, an accent, a regional accent, or other language information).

In an illustrative example, including a plurality of speech criteria, the application may generate a respective audio file based on a first text string and a respective speech criterion, generate a respective second text string based on the respective audio file, compare the respective second text string to the first text string, and store (e.g., in metadata associated with the entity) the respective second text string if it is not identical to the first text string.

In an illustrative example, the application may convert the first text string to a first audio signal, generate speech at a speaker based on the audio signal, detect the speech using a microphone to generate a second audio signal, and process the audio signal to generate the audio file. In some embodiments, the application generates the speech at the speaker based on at least one speech setting of the text-to-speech module.

At step 806, the application generates a second text string based on the audio file. The second text string should match the first text string and describe the entity identified at step 802, aside from differences that may arise from the text-to-speech conversion or the speech-to-text conversion. For example, as illustrated in FIG. 3, the application may include speech-to-text engine 320, which may be configured to receive an audio input or file generated thereof and translate the audio to a transcript (e.g., a text string). The application may receive the audio input at a microphone or other suitable sound-detecting device. The application may apply one or more settings in receiving, conditioning and converting the audio file to text. For example, aspects of conditioning and translating the detected "voice" may be tuned or otherwise selected based on any suitable criteria.

In an illustrative example, the application generates a playback of the audio file at a speaker, detects the playback using a microphone to generate an audio signal, and converts the audio signal to the second text string by identifying one or more words. In some embodiments, the application converts the audio signal to the second text string based on at least one text setting of the speech-to-text module.

At step 808, the application compares the second text string to the first text string. In some embodiments, the application compares each character of the first and second text strings to determine a match. In some embodiments, the application determines to what extent the first text string and the second text string match (e.g., what fraction of the text strings match, how many discrepancies exist, how many keywords match or do not match). The application may use any suitable technique to determine if the first and second text strings are identical, similar or different, and to what extent they are similar or different.

At step 810, the application stores the second text string if it is not identical to the first text string. In some embodiments, the application stores the second text string in metadata associated with the entity. In some embodiments, step 810 includes the application updating existing metadata based on one or more text queries. For example, as queries are responded to and search results are evaluated, the application may update the metadata to reflect the new learnings. If the second text string is determined to be identical to the first text string, no new information is gained by storing the second text string. However, an indication of the comparison of step 808 may be stored in the metadata to increase confidence in the reachability of the entity via voice queries. For example, if the second text string is identical to the first text string, this may serve to validate the existing metadata for voice-based querying.

Figure 9:
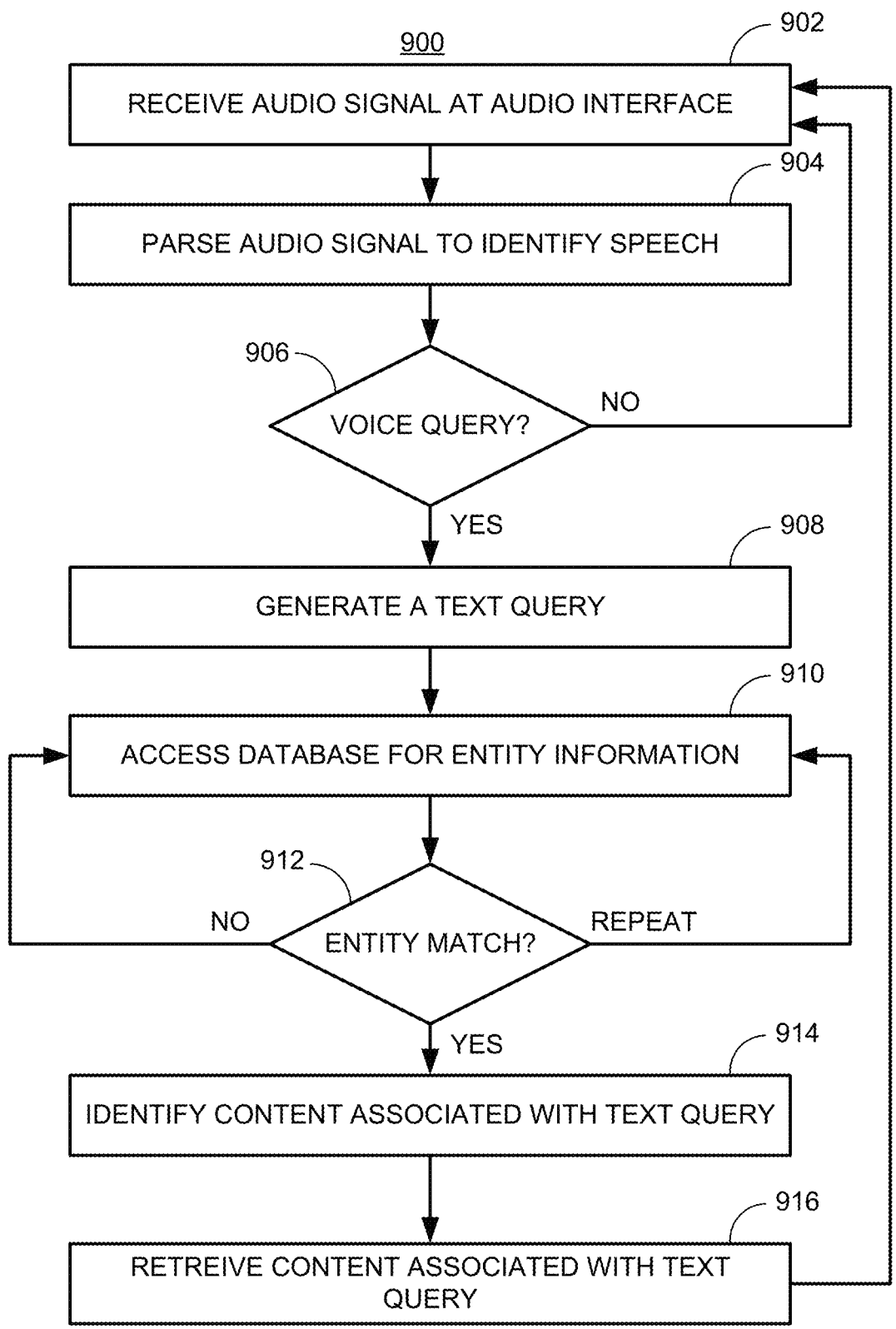
FIG. 9 shows a flowchart of an illustrative process for retrieving content associated with an entity of a voice query, in accordance with some embodiments of the present disclosure.

FIG. 9 shows a flowchart of illustrative process 900 for retrieving content associated with an entity of a voice query, in accordance with some embodiments of the present disclosure. For example, a query application may perform process 900, implemented on any suitable hardware such as user device 400 of FIG. 4, user equipment system 401 of FIG. 4, user device 550 of FIG. 5, network device 520 of FIG. 5, any other suitable device, or any combination thereof. In a further example, the query application may be an instance of application 560 of FIG. 5.

At step 902, the query application receives an audio signal at an audio interface. The system may include a microphone or other audio detecting device and may record audio files based on audio input to the device.

At step 904, the query application parses the audio signal of step 902 to identify speech. The query application may apply any suitable decimation, conditioning (e.g., amplifying, filtering), processing (e.g., in the time or spectral domains), pattern recognition, algorithms, transforms, any other suitable actions, or any combination thereof. In some embodiments, the query application identifies words, sounds, phrases, or a combination thereof using any suitable technique.

At step 906, the query application determines whether a voice query has been received. In some embodiments, the query application determines that a voice query is received based on parameters of the audio signal. For example, periods without speech before and after the query may delineate the extent of the voice query in a recording. In some embodiments, the query application identifies keywords in the spoken order, and applies a sentence or query template to the keywords to extract a text query. For example, the arrangement of nouns, proper nouns, verbs, adjectives, adverbs, and other parts of speech may provide an indication of the beginning and end of the voice query. The query application may apply any suitable criteria in parsing the audio signal to extract text. At step 908, the query application generates a text query based on the results of steps 904, and 906. In some embodiments, at step 908, the query application may store the text query in suitable storage (e.g., storage 408). If, at step 906, the query application determines that a voice query has not been received, or otherwise that a text query cannot be generated based on the parsed audio of step 904, the query application may return to step 902 and proceed to detect audio until a voice query is received.

At step 910, the query application accesses a database for entity information. The query application uses the text query of step 908 to search among information of the database. The query application may apply any suitable search algorithm to identify information, entities, or content of the database.

At step 912, the query application determines whether an entity of the database of step 910 matches the text query of step 908. The query application may identify and evaluate a plurality of entities to find a match. In some embodiments, a text query includes more than one entity, and the query application searches among content to determine a content item that has the entities associated in metadata (e.g., by comparing the text query to the metadata tags of the content item). In some circumstances, the query application may be unable to identify a match and in response may continue searching, search among another database, modify the text query (e.g., return to step 908, not shown), return to step 904 to modify a setting used at step 904 (not shown), return an indication that no search results were found, any other suitable response, or any combination thereof. In some embodiments, the query application may identify a plurality of entities, content, or both that match the text query. Step 914 includes the query application identifying content associated with the text query of step 908. In some embodiments, steps 914 and 910 may be reversed, and the query application may search among content based on the text query. In some embodiments, the entity may include a content identifier, and accordingly steps 910 and 914 may be combined.

At step 916, the query application retrieves content associated with the text query of step 908. At step 916, for example, the query application may identify a content item, download a content item, stream a content item, generate for display a content item or list of content items (e.g., or a list of links to content items), or a combination thereof.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for generating entity metadata for voice queries, the method comprising:
   receiving a search query comprising a plurality of entities;
   identifying an entity of the plurality of entities;
   generating, using a text-to-speech module, an audio file comprising speech content based on a first text string and at least one speech criterion, wherein the first text string describes the entity, and wherein the at least one speech criterion comprises a pronunciation setting for generating the speech content;
   generating, using a speech-to-text module, a second text string based on the speech content in the audio file;
   comparing the second text string to the first text string;
   in response to determining that the second text string is not identical to the first text string, storing, in metadata associated with the entity, the second text string and pronunciation information, based on the pronunciation setting, for the second text string; and
   disambiguating a subsequent search query comprising the entity based on the metadata and on the search query.

2. The method of claim 1, wherein the at least one speech criterion comprises a language setting.

3. The method of claim 1, wherein the at least one speech criterion comprises a plurality of speech criterion, the method further comprising:
   generating, using the text-to-speech module, a respective audio file based on a first text string and a respective speech criterion;
   generating, using the speech-to-text module, a respective second text string based on the respective audio file;
   comparing the respective second text string to the first text string; and
   storing, in metadata associated with the entity, the respective second text string if it is not identical to the first text string.

4. The method of claim 1, further comprising updating the metadata based on one or more text queries.

5. The method of claim 1, further comprising storing, in metadata associated with the entity, a phonetic representation of the first text string.

6. The method of claim 1, wherein generating the audio file based on the first text string comprises:
   converting the first text string to a first audio signal;
   generating speech at a speaker based on the audio signal;
   detecting the speech using a microphone to generate a second audio signal; and
   processing the audio signal to generate the audio file.

7. The method of claim 6, wherein generating the speech at the speaker is further based on at least one speech setting of the text-to-speech module.

8. The method of claim 1, wherein generating the second text string based on the audio file comprises:
   generating a playback of the audio file at a speaker;

detecting the playback using a microphone to generate an audio signal; and converting the audio signal to the second text string by identifying one or more words.

9. The method of claim 8, wherein converting the audio signal to the second text string is based on at least one text setting of the speech-to-text module.

10. A system for generating entity metadata for voice queries, the system comprising:

control circuitry configured to:

receive a search query comprising a plurality of entities;

identify an entity of the plurality of entities;

generate an audio file, using an audio interface coupled to the control circuitry, comprising speech content based on a first text string and at least one speech criterion, wherein the first text string describes the entity, and wherein the at least one speech criterion comprises a pronunciation setting for generating the speech content;

generate, using the audio interface, a second text string based on the speech content in the audio file;

compare the second text string to the first text string;

in response to determining that the second text string is not identical to the first text string, store, in metadata associated with the entity, the second text string and pronunciation information, based on the pronunciation setting, for the second text string; and disambiguate a subsequent search query comprising the entity based on the metadata and on the search query.

11. The system of claim 10, wherein the at least one speech criterion comprises a language setting.

12. The system of claim 10, wherein the at least one speech criterion comprises a plurality of speech criterion, and wherein the control circuitry is further configured to:

generate, using the audio equipment, a respective audio file based on a first text string and a respective speech criterion;

generating, using the audio equipment, a respective second text string based on the respective audio file;

compare the respective second text string to the first text string; and store, in metadata associated with the entity, the respective second text string if it is not identical to the first text string.

13. The system of claim 10, wherein the control circuitry is further configured to update the metadata based on one or more text queries.

14. The system of claim 10, wherein the control circuitry is further configured to store, in metadata associated with the entity, a phonetic representation of the first text string.

15. The system of claim 10, wherein the audio equipment comprises a speaker and a microphone, and wherein the control circuitry is further configured to generate the audio file based on the first text string by:

converting the first text string to a first audio signal;

generating speech at the speaker based on the audio signal;

detecting the speech using the microphone to generate a second audio signal; and processing the audio signal to generate the audio file.

16. The system of claim 15, wherein the control circuitry is further configured to generate the speech at the speaker based on at least one speech setting.

17. The system of claim 10, wherein the audio equipment comprises a speaker and a microphone, and wherein the control circuitry is further configured to generate the second text string based on the audio file by:

generating a playback of the audio file at the speaker;

detecting the playback at the microphone to generate an audio signal; and converting the audio signal to the second text string by identifying one or more words.

18. The system of claim 17, wherein the control circuitry is further configured to convert the audio signal to the second text string based on at least one text setting of the speech-to-text module.

* * * * *